Figure 1:
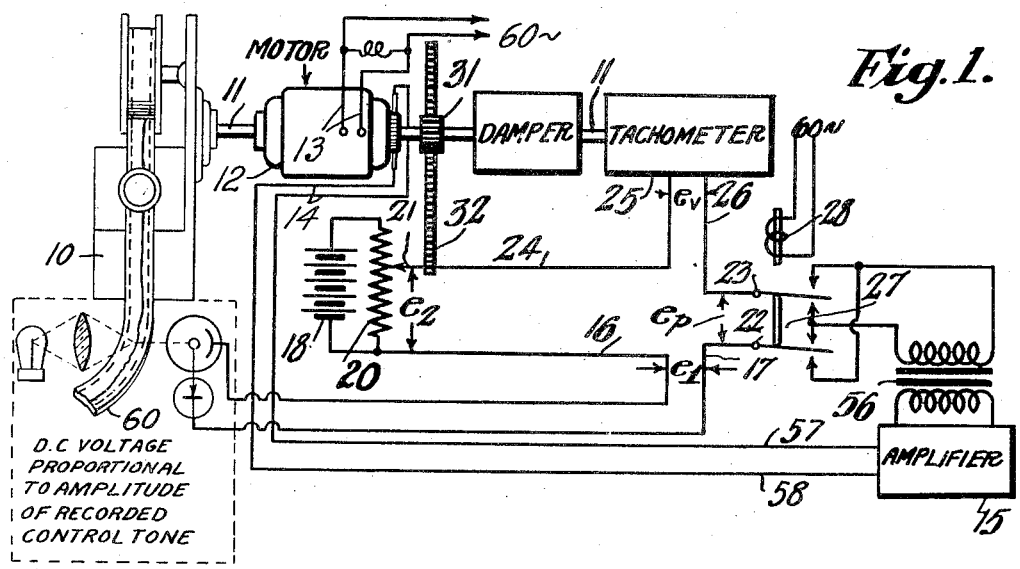

Inventor
Edward W. Kellogg
By
Attorney

Patented Nov. 18, 1947

2,431,257

UNITED STATES PATENT OFFICE 2,431,257

CONTROLLING MOTION BY MEANS OF VOLTAGE AS APPLIED TO GUNNERY TRAINERS

Edward W. Kellogg, Indianapolis, Ind., assignor to Radio Corporation of America, a corporation of Delaware Application December 23, 1943, Serial No. 515,460

1 Claim. (Cl. 172—239)

The present invention relates to motion control apparatus and more particularly to a system of controlling a picture projector by variations of voltage derived from a rectified control tone previously recorded on motion picture film, whereby the projector is caused to point in a direction related to the picture and is moved during the progress of the picture so that at each instant it points in a predetermined direction. One of many uses of such a control system is in gunnery training. In certain fields of gunnery the direction of the target from the gunner changes rapidly and through such large angles that satisfactory realism cannot be attained within the limits of a picture such as can be projected with the projector in a fixed position. To overcome this limitation it is desirable to depend on swinging the projector to produce the desired apparent motion of the target. A desiratum of a system of this character is that all movements must be smooth and free from jerkiness and that the operating motor run steadily at various speeds covering a very wide range.

In previous devices wherein it is desired to move some member in accordance with the magnitude of a voltage (or of some other physical quantity) as for example a remote recording meter, balance-seeking systems have been employed, and while closeness of balance between the fixed and the varying voltage is maintained in a fairly satisfactory degree, the motor speed at any instant is quite indeterminate. When the voltage is changing slowly the motor moves the driven device and the voltage control, along in a series of small steps so that quite close accuracy of position may be obtained, but not accuracy of velocity. In other words, this prior system is designed to obtain quick action without much concern for the precise value of the instantaneous speed.

Some of the objects of the present invention are: to provide a system for controlling a movable device by means of voltage changes derived from a control tone wherein the instantaneous motor speed is of more importance than extreme accuracy of position of the device; to provide an improved system for controlling motion in accordance with variations in voltage of a control tone; to provide a control system wherein the motion or speed is free from random irregularities; to provide a voltage control system wherein a wide range of motor input can be achieved, and wherein the motor speed can be closely governed; to provide in association with a device moving system, a novel speed control for maintaining smooth movement and an absence of step jerkiness; to provide a system controlled by the voltage of a recorded control tone wherein a movable unit, such as a projector, is caused to move in a manner predetermined by variations of the voltage while the speed of movement at any instant is directly proportional to a previously determined voltage; and to provide other improvements as will hereinafter appear.

Figure 2:
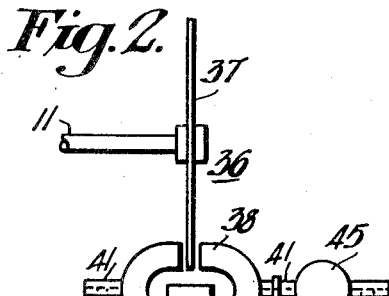
Figure 3:
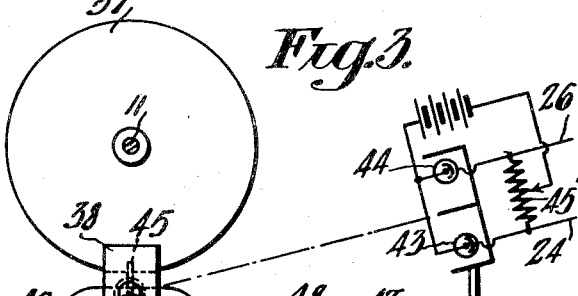
Figure 4:
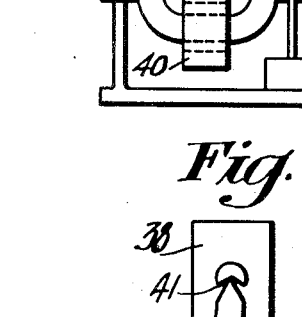
Figure 5:
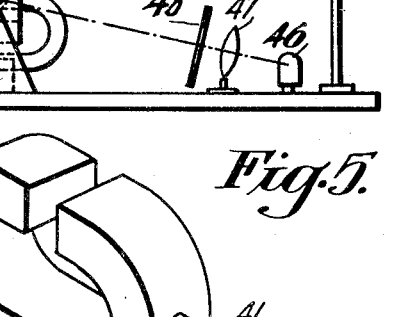

In the accompanying drawings, Fig. 1 is a diagrammatic showing of a control system embodying one form of the present invention; Fig. 2 represents an end elevational view of one form of tachometer employed in the system; Fig. 3 represents a side elevational view of the device of Fig. 2, showing the related light-controlled circuit; Fig. 4 represents a detail of one form of temperature compensating means; and Fig. 5 represents a detail of a modified form of temperature compensating means.

Referring to the drawings, one embodiment of the present invention consists of a projector 10 of any well known type for projecting pictures upon a screen or other background. In the present embodiment the projector 10 is utilized to project an object on the screen and while so projecting, to cause the object to move on the screen by varying the aim of the projector in response to variations of voltage, which latter, in the present instance, is derived from a rectified control tone. One specific use of the invention is to utilize the controlled object as a target in gunnery training but broadly considered the invention is not so limited. The projector 10 may be mounted to swing in a vertical plane or in a horizontal plane according to the desired controlled movement of the projected object, or to swing both vertically and horizontally under the control of two independent tones and systems. Suitable gearing for operating the projector in the selected plane is arranged to be driven by the shaft 11 of a motor 12 which in the preferred form is of the separately excited commutator type having a field source 13 of alternating current and a source 14 of current of the same frequency for application to the commutator and armature delivered from an amplifier 15.

For supplying alternating current to the amplifier 15, a varying direct current voltage $e_1$, derived from a rectified control tone, is delivered to a circuit including input conductors 16 and 17, a potentiometer 20 having a movable pointer or sweep 21, and a battery 18, furnishing a fixed direct current voltage across said potentiometer 20. The varying voltage $e_1$ is derived from a rectified control tone previously recorded upon a motion picture film 60. The output voltage $e_2$ of the potentiometer 20 depends on the position of sweep 21. The output voltage $e_p$ of the circuit, which in the absence of voltage generated in the tachometer 25, will be $e_1-e_2$, reaches a terminal 22 of the pole changer 27, 28, via conductor 17, and on the other side reaches a terminal 23 by a conductor 24, tachometer control 25 and conductor 26. The tachometer control 25 will be hereinafter explained. Terminals 22 and 23 are the input terminals of a vibratory pole changer 27 energized by the magnet 28, by alternating current of the same frequency as the motor field supply 13. With this arrangement, when the polarity of the direct current voltage $e_p$ across the pole changer 27 reverses, the motor 12 is caused to reverse and drive the shaft 11 in the direction opposite to which it was turning before.

A type of motor suited to the present application is the commutating, alternating current type, but instead of being connected in series with the armature, the field is separately excited. It is desirable in such a motor that the armature and field currents be in phase. To this end it is well to drive the motor from a relatively high impedance amplifier output circuit, and to adjust the phase of the output current either by some one of the well-known phase correcting circuits, or else by adjusting the ratio of resistance to reactance, or the tuning of the pole-changer 27—28.

In order to shift the potentiometer pointer 21, the shaft 11 has a gear 31, keyed thereon and in mesh with a rack bar 32, which moves the sweep or pointer 21 across the resistance of potentiometer 20. The direction of travel of the pointer 21 is in accordance with whether $e_2$ is greater or less than $e_1$, but the effect is always to bring the voltage $e_p$ back to zero. The device as so far described, but with the tachometer omitted, is typical of apparatus already in use for controlling motion, depending on the principle of automatically seeking a balance. Such apparatus, as previously stated, operates at indeterminate and irregular instantaneous speed, although its average speed is necessarily correct if the position is maintained close to correct.

For certain applications, as for example a gunnery trainer, it is fully as important to have the instantaneous velocity correct, as the position, for the gunner must learn to point his gun ahead of the target by an angle which depends on the speed of the target.

It is obvious that if the balance-seeking device just described maintains the moved member in the desired position, within small tolerances of inaccuracy, the average rate of movement over a considerable period of time, must also conform to the predetermined desired values, but when the velocity is low, the motion can be in a series of small jerks and still keep the position close to correct. Such jerkiness would defeat the purpose of a gunnery trainer of the kind here described. One reason for jerkiness is that no motion occurs until the motor input rises sufficiently to overcome bearing and load friction. Further reasons why the speed cannot be accurately controlled in a simple position-balancing system, are that the offset on the potentiometer (or position unbalance) is necessarily maintained small to meet the position accuracy requirement, and with so small an offset the point of registration of the sweep is subject to large errors relative to the total offset, and the steps in resistance of practically available potentiometers are not infinitely small. Smooth and reasonably accurate control of speed demands that the offset be large enough to give a considerable number of steps of resistance (and hence of potentiometer voltage); the number required being dependent on how fine a control of speed is called for, or in other words, on what sized steps in speed may be tolerated. This increased offset for controlling speed, may be provided without serious sacrifice of position accuracy, as I shall now explain.

For the purpose of predetermining the instantaneous motor speed at values appropriate to the corresponding picture frame it is planned to so regulate the level of the control tone during recording that an unbalance between voltages $e_1$ and $e_2$ is allowed for, such unbalance being proportional to (or at least a definite and reproducible function of) the desired speed at that particular instant. For example, if at a certain picture frame or other recording, the projector 10 or other device should be at a certain position X, and should be moving in the direction to reduce X at a speed V, then the controlling element (for example a recorded tone) should in accordance with the present invention be recorded in such a manner as to give the control voltage a value at this point $e_1 = AX - BV$, wherein A and B are constants determined in the design of the equipment. The magnitude of A is established by the voltage of battery 18 across the potentiometer 20, while the magnitude of B is established by several factors which will now be explained.

It is obvious that increased input is required to make the motor run faster, but the relation between supplied voltage and speed, is with usually available types of motors, by no means constant, depending as it does not only on the counter-electromotive force developed in the motor, but on friction, mechanical load, brush resistance, armature resistance, and other such factors. In my present invention I produce an effect equivalent to greatly magnifying the counter-electromotive force (the factor which is directly proportional to instantaneous speed) so that the other factors mentioned are almost completely masked by this speed-dependent voltage. This counter-electromotive force is developed in an electrical tachometer instead of in the motor armature itself, and being small in magnitude, is introduced at the input end of the amplifying system, whose output is supplied to the motor armature, whereas if it were introduced in the motor input (where the counter E. M. F. of the motor itself has to work to control input) a relatively large velocity-voltage would be required to exert the desired control of the motor power input. The arrangement is illustrated in Fig. 1. Because of the high amplification in the amplifier 15, the range of motor input can be achieved with only a small change in the voltage $e_p$ applied to the pole changer 27. In the preferred construction the quantity B can be established almost entirely by the use of a tachometer 25 operatively mounted on the shaft 11 in order to create a supplemental voltage $e_v$ in series with the circuit establishing the output voltage $e_p$. If the tachometer 25 generates a voltage CV, then the higher the amplification of amplifier 15, the more closely B approaches C, B being slightly larger. The action is exactly analogous to the use of feed-back in amplifiers.

The tachometer 25 may be of the common type having a permanent magnet field and a commutator. In some applications there may be objection to the slight irregularities produced by the commutator segments. I have, in Figures 2, 3, 4, and 5, illustrated a form of tachometer which does not employ a commutator, but wherein the rotation of one member produces a force on a movable cooperating member, and the deflection of the second member may be used according to any of a number of well-known methods, to produce a proportional current or voltage. One such method is to vary a magnetic coupling and use this to vary the amplitude of an alternating current which is then rectified. I have chosen to illustrate the tachometer as operating on the photoelectric principle.

As shown, the tachometer 36 consists of a disc 37 of copper or aluminum keyed to the shaft 11 and straddled by the poles of a magnet 38, which may be a permanent magnet or may be excited by a coil 40 through which direct current is passed. The magnet 38 is supported for swinging movement on pivots, such as knife edge bearings 41 and has a suitable dashpot 42 for damping purposes.

For supplying the supplemental speed proportioned voltage, the conductors 24 and 26 lead respectively to the output terminals of two opposed photo-electric cells 43 and 44, but are bridged by a potentiometer 45' which is manually operable to balance the tube output at zero rotation speed. The two cells 43 and 44 are illuminated by light from a mirror 45 attached to the pivot extension of the magnet 38 so that angular movement of the magnet 38 will shift the reflected beam of light to thus vary the light intensity of one cell with respect to the other. This light beam is projected from a lamp 46 by way of lens 47 and aperture 48 upon the mirror 45, and the adjustment is such that normally the reflected light beam is equally divided between the two photo-cells 43 and 44.

As a means for compensating for the change in resistance of the tachometer disc 37 when the temperature changes, one form of mechanism is shown in Fig. 4, wherein a restoring device in the form of a thread 50 is attached at one end to a pin 51 fixed to the magnet 38, and at its other end to a flat spring 52, which projects from and is subject to bending movement of a bimetallic strip 53. This strip 53 extends from any conveniently located fixed part and is arranged to reduce the tension on the thread 50 as the temperature rises, and to increase the tension on the thread 50 as the temperature falls. The pin 51 is attached to the magnet 38 below and in vertical alignment with the pivotal axis of the magnet and hence a swing of the magnet will move the pin 51 to one or the other side of the vertical and thus create a mechanical couple through which the action of the spring 52 and thread 50 functions for restoring purposes.

In Fig. 5 another form of compensating mechanism is shown, wherein a bimetallic strip 54 is attached to the magnet 38 below and aligned with one of the pivots 41, and extends outwardly therefrom, generally parallel to the axis of the pivots 41. The free end of this strip 54 is attached to one end of a helical spring 55, the opposite end of which is attached to a suitably fixed anchorage. Any swing of the magnet 38, therefore, alters the effective couple arm and creates a restoring torque in the spring 55.

In operation the tachometer is actuated by the turning of the motor shaft 11 in either direction depending upon whether voltage $e_1$ is greater or less than the voltage $e_2$. According, as the disc 37 turns the magnet 38 will have a swing and thus cause the mirror 45 to alter the beam of light directed to the photo-electric cells 43 and 44, so that one or the other, as the case may be, will be subject to a greater light intensity than the other. This action results in a change in the voltage $e_v$ which now either opposes or adds to the voltage in the circuit and thereby influences the output voltage $e_p$ in a manner proportional to the speed of the shaft 11. The direct current voltage $e_p$ is changed to alternating current in passing the pole-changer 27, traverses the transformer 56 for amplification by the amplifier 15, which latter delivers the current by conductors 57 and 58 to the motor terminals 14. Any changes in temperature of the disc 37 are compensated for by the device of Fig. 4 or the device of Fig. 5.

In the following claims the term "track" is used to designate any modification of a continuously movable record, whereby a variable voltage may be derived, and which can be recorded in such a manner as to establish the magnitude of said voltage as a function of the longitudinal position of said record with respect to a reproducing system. The most common form of such a track is a recorded tone whose frequency or whose amplitude is varied to produce a variation in the desired control voltage, hence the term "control tone" is often used to designate such means of predetermining desired operations. The tone or other visible indicia or mechanical deformations of the record may be recorded on the same record as the other element (as for example, a picture to be projected) or on a separate synchronously driven record.

In Fig. 1 and in the claim, the three sources of voltage are indicated and described as in series with each other and with the pole changer. This is the normal method of adding several voltages, but it is well known that at some sacrifice in the magnitude of the total voltage a number of voltages may be combined in desired proportions using other than a series connection. Such an arrangement, for example, is common in what are known as "mixers" used for combining electric currents or voltages representing different sounds. It is to be understood that my invention includes any circuit arrangements which effectively add the voltages or fractions of the voltages to produce a resultant dependent on all of said voltages, and is not limited to a series circuit.

I claim as my invention:

In a gunnery training system wherein both the position and rate of movement of a target are essential to the establishment of the correct aim, the combination of a projector for forming a target image on a screen, a source of control voltage the magnitude of which can be determined at any instant in accordance with desired movements of said target, means for producing a voltage dependent on the position of said projector, means for producing a voltage the direction and magnitude whereof are dependent on and proportional to the velocity of movement of said projector, a circuit in which said three voltages are added in such sense as to produce a resultant voltage equal to the difference between said control voltage and the algebraic sum of said position and velocity voltages, and means including an amplifier for moving said projector in the direction required to bring said resultant voltage to zero.

EDWARD W. KELLOGG.

REFERENCES CITED

The following references are of record in the file of this patent:

UNITED STATES PATENTS

| Number | Name | Date |
|---|---|---|
| Re. 21,533 | Stoekle et al. | Aug. 13, 1940 |
| 450,985 | Williams | Apr. 21, 1891 |
| 2,286,571 | Pollard | June 16, 1942 |
| 2,354,391 | McCourt | July 15, 1944 |
| 2,367,746 | Williams | Jan. 23, 1945 |
| 2,381,478 | Zukor | Aug. 7, 1945 |
| 2,151,718 | Riggs | Mar. 28, 1939 |
| 2,286,571 | Pollard | June 16, 1942 |
| 499,544 | Henry | June 13, 1893 |
| 1,677,990 | Robbins | July 24, 1928 |
| 2,113,164 | Williams | Apr. 5, 1938 |
| 2,113,436 | Williams | Apr. 5, 1938 |
| 2,115,834 | Young | May 3, 1938 |
| 2,172,064 | Harrison | Sept. 5, 1939 |
| 2,347,563 | Keller | Apr. 25, 1944 |